United States Patent

[11] 3,603,977

[72] Inventors Andras I. Szabo
Export;
Miklos Sarkozi, Monroeville, both of, Pa.

[21] Appl. No. 834,710
[22] Filed June 19, 1969
[45] Patented Sept. 7, 1971
[73] Assignee Westinghouse Electric Corporation
Pittsburgh, Pa.

[54] DIGITAL-TO-ANALOG CONVERTER UTILIZING PULSE DURATION MODULATION
6 Claims, 6 Drawing Figs.

[52] U.S. Cl. ........ 340/347 DA, 235/154
[51] Int. Cl. ........ H03k 13/02
[50] Field of Search ........ 340/347 AD, 347 DD; 235/154, 92, 70, 65, 50, 53; 328/34, 38

[56] References Cited

UNITED STATES PATENTS

| | | | |
|---|---|---|---|
| 2,907,021 | 9/1959 | Woods | 340/347 |
| 3,064,248 | 11/1962 | Glick | 340/347 |
| 3,126,476 | 3/1964 | Pariser et al. | 328/38 X |
| 3,214,573 | 10/1965 | Anderson et al. | 235/92 (53) |

*Primary Examiner*—Maynard R. Wilbur
*Assistant Examiner*—Joseph M. Thesz, Jr.
*Attorneys*—F. H. Henson and R. G. Brodahl

ABSTRACT: Described is a novel digital-to-analog converter employing pulse duration modulation techniques, and wherein the desired analog signal is derived by integrating pulses of short duration and relatively high repetition rate rather than longer pulses of lower repetition rate. This materially reduces the ripple content of the filtered pulses and reduces the requirements of the low-pass filter connected to the output of the converter.

DIGITAL-TO-ANALOG CONVERTER UTILIZING PULSE DURATION MODULATION

BACKGROUND OF THE INVENTION

The conversion of binary coded digital information to quantized analog signals is of great importance in process control, telemetry, and many other similar fields. In a computer-controlled rolling mill system, for example, the output of the computer is in the form of a digital signal; and this must be converted into an analog signal for use in the rolling mill motor control loops and the like.

Such digital-to-analog converters are now well known. The most obvious conversion scheme utilizes a current summing network or a resistive ladder network, selected by analog switches. These switches, in turn, are driven by the flip-flops of a digital register. The register stores the digital information; and the corresponding analog level can be maintained for any desired duration. The most important advantages of this system are fast response and ripple-free analog output. However, the accuracy of the system is dependent upon the tolerances of the resistors used in the current summing or ladder network, and this seriously limits the usefulness of the scheme.

High accuracy digital-to-analog conversion can be achieved by utilizing pulse duration modulation techniques. With this approach, the accuracy of the conversion is determined by the precision of time measurements, rather than by component tolerance values. In the usual type of pulse duration modulation system, the contents of a digital register is compared with the count of a binary counter. When the count of the counter matches that of the register, a bistable unit such as a flip-flop is caused to change states, thereby producing an output pulse whose width varies in direct proportion to the magnitude of the digital quantity which is to be converted to analog form. In order to convert the pulsed output of the counter into analog form, the pulses must be passed through a low-pass filter which produces the necessary smoothing of the output signal. As will be understood, the occurrence of the long pulses interspaced with long spaces in such an output signal requires the use of an output filter with a long time constant in order to reduce the ripple contents in the final analog signal to an acceptable level.

SUMMARY OF THE INVENTION

As an overall object, the present invention provides a new and improved digital-to-analog converter which utilizes pulse duration modulating techniques and which is capable of the same high accuracy as prior art pulse duration modulation devices, but at the same time considerably reduces the requirements of the output filter for the device.

More specifically, an object of the invention is to provide a digital-to-analog converter of the type described which effectively breaks up the relatively long pulses of prior art pulse duration modulation converters into shorter pulses of high repetition rate, thereby reducing the ripple content of the output signal from the converter.

In accordance with one specific embodiment of the invention, a digital-to-analog converter is provided comprising a register or the like having a plurality of output leads with ON and OFF signals thereon representing bits in a binary number. A source of pulses is applied to a binary counter, this counter comprising a plurality of bistable units connected in cascade, with each bistable unit having a first output terminal connected to the input of the next successive bistable unit in the counter. In accordance with the known operation of a bistable unit, it is provided with two output terminals, the signals appearing on the second terminals being the compliments of those on the first terminals. The number of bistable units in the counter is equal to the number of output leads from the register. First logic circuit means, which can include AND circuits, are connected to selected ones of the output terminals of said counter bistable units; while second logic circuit means, which can include AND circuits, are connected to the output terminals of the register as well as the output of said first logic circuit means and at least one of the output terminals of said bistable units in the counter. The outputs of the aforesaid second logic circuit means are then combined and filtered or integrated to produce an analog signal.

As will be seen, the arrangement is such that a plurality of output pulses will be produced for any digital number stored in the register, the combined time integral of these pulses being directly proportional to the magnitude of the number represented by the digital output. By virtue of the fact that for most digital values a plurality of pulses are produced rather than a single pulse, the filtering requirements at the output of the conventer are materially reduced as is the ripple content of the final analog signal.

The above and other objects and features of the invention will become apparent from the following detailed description taken in connection with the accompanying drawings which form a part of this specification and in which:

FIG. 1 is a block diagram of one embodiment of the invention constructed in accordance with the teachings of the invention;

FIG. 2 comprises waveforms illustrating the operation of the invention of FIG. 1;

Figure 1:
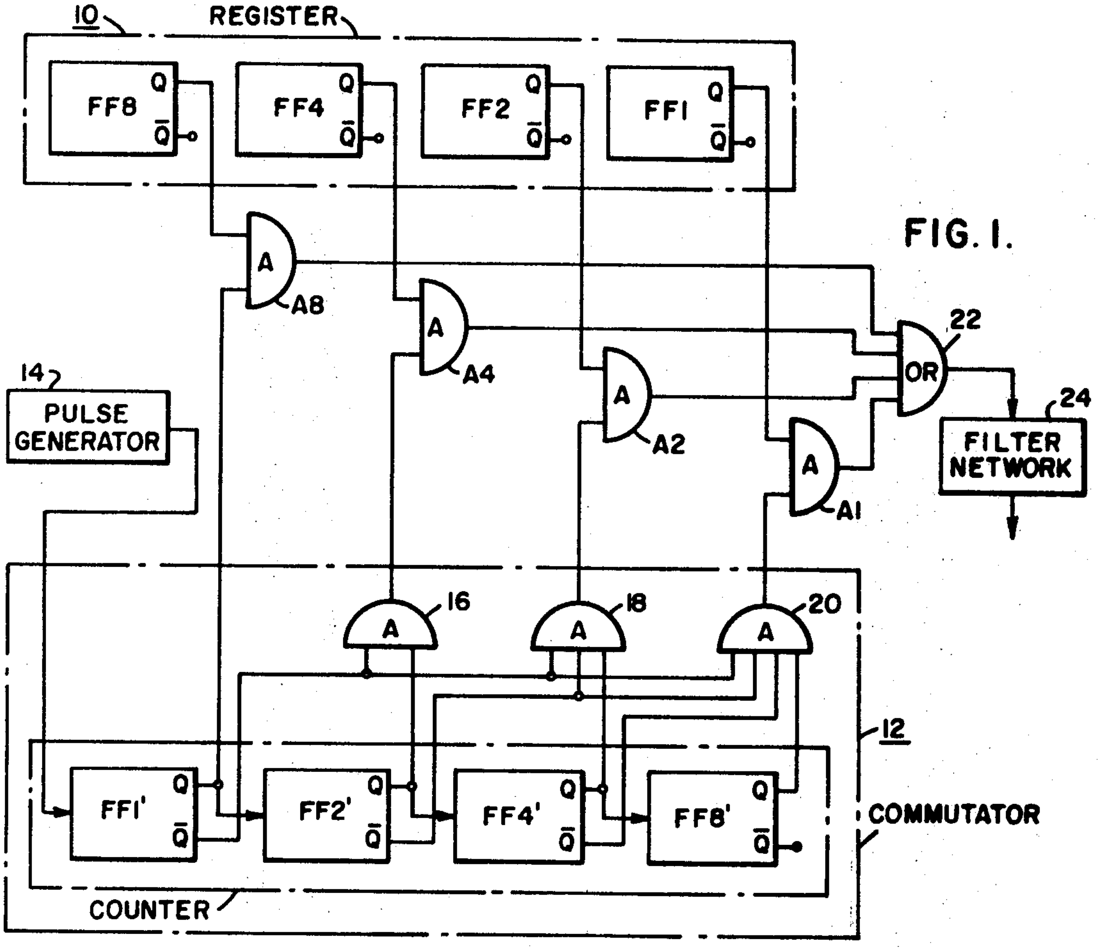

With reference now to the drawings, and particularly to FIG. 1, the system shown includes a binary register 10 which may, for example, comprise flip-flop units FF1, FF2, FF4 and FF8. Each of the flip-flop units FF1 through FF8 is provided with two output terminals identified as Q and $\overline{Q}$. At all times, the signal appearing on lead $\overline{Q}$, for example, is the compliment of that appearing on the terminal Q. The flip-flop FF1 has stored therein the least significant bit $2^0$; the flip-flop FF2 has the next significant bit $2^1$ stored therein; flip-flop FF4 has the next significant bit $2^2$ stored therein; and flip-flop FF8 has the most significant bit $2^3$ stored therein. The Q outputs of the flip-flops FF1 through FF8 are each applied to one input of an associated AND circuit A1, A2, A4 or A8, respectively.

Also included in the circuitry of FIG. 1 is a commutator 12 comprising a counter consisting of flip-flops FF1′, FF2′, FF4′ and FF8′ connected in cascade. Like the flip-flops in register 10, each flip-flop FF1′ through FF8′ is provided with Q and $\overline{Q}$ terminals. The Q terminal of each flip-flop in the commutator 12 is connected to the input of the next successive flip-flop as shown. The input to the first flip-flop FF1′ is the output of a pulse generator or clock 14.

The Q terminal of flip-flop FF1′ is connected to the other input of AND circuit A8. The $\overline{Q}$ terminal of flip-flop FF1′ and the Q terminal of flip-flop FF2′ are applied as inputs to AND circuit 16, the output of this AND circuit being applied as one of the two inputs to AND circuit A4. Similarly, the $\overline{Q}$ terminal of flip-flop FF2′ and the Q terminal of flip-flop FF4′ are connected as inputs to AND circuit 18 along with the $\overline{Q}$ terminal of flip-flop FF1. The output of the AND circuit 18, in turn, is connected to one of the two inputs to AND circuit A2. Finally, the Q terminal of flip-flop FF8′ as well as the $\overline{Q}$ terminals of flip-flops FF1′, FF2′ and FF4′ are connected as inputs to an AND circuit 20, the output of this latter AND circuit being connected as an input to AND circuit A1. The outputs of all of the AND circuits A1, A2, A4 and A8 are connected to the input of an OR circuit 22, the output of the OR circuit 22 being connected to the input of an RC filter network 24.

Figure 2:
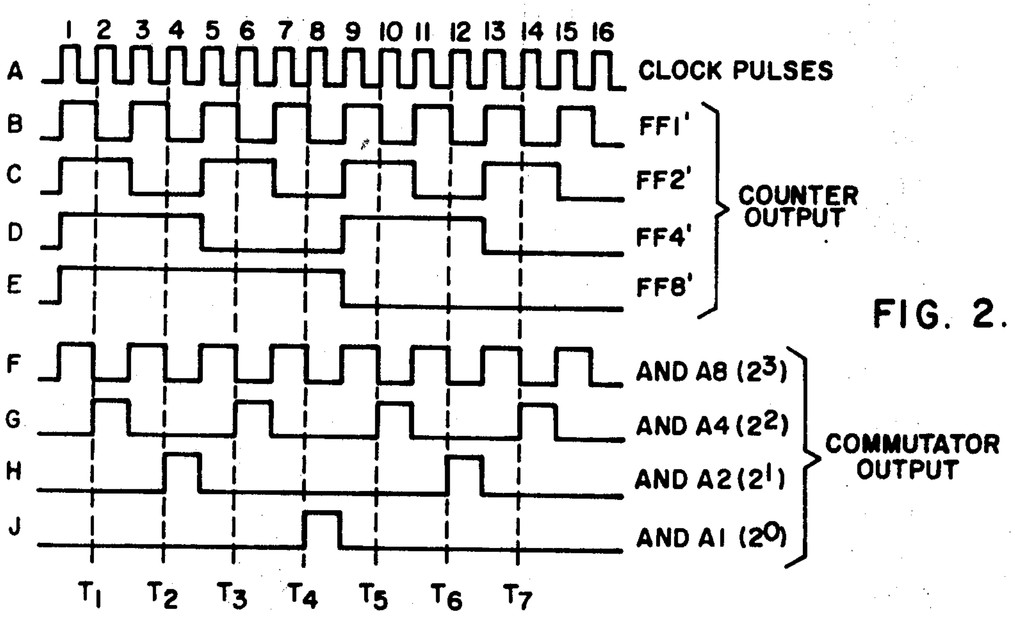

The operation of the circuit of FIG. 1 can best be understood by reference to FIG. 2 wherein the waveform A represents the clock pulses generated by the pulse generator 14. In an example given in FIG. 2, there are 16 such clock pulses represented by waveform A. These pulses, when applied to the flipsflop FF1′, will produce at terminal Q waveform B comprising a series of pulses of one-half the frequency of the input pulses from pulse generator 14. The output of flip-flop FF2′ appears as waveform C comprising pulses twice the width of those in waveform B but half the frequency. The output pulses appearing on terminal Q of flip-flop FF4′ will appear as waveform D; and those on output terminal Q of flip-flop FF8′ will appear as waveform E.

Waveform F in FIG. 2 represents that waveform applied to the lower input of the and circuit A8 and is the same as waveform B. Assuming that the signal at terminal Q of flip-flop FF8 in the register 10 is ON or enabled, the output of the AND circuit A8 will be eight pulses for every sixteen input clock pulses in waveform A. AND circuit 16 will produce an ON output when the output of flip-flop FF1′ is negative or OFF while the output of flip-flop FF2′ is positive or ON. From an examination of waveforms B and C, it can be seen that this occurs at times $T_1$, $T_3$, $T_5$ and $T_7$. Consequently, waveform G represents the output of AND circuit 16. It can be seen that when the output of flip-flop FF4 in register 10 is ON or positive, four pulses will be produced at the output of AND circuit A4, as represented by waveform G for each 16 input clock pulses.

AND circuit 18 will produce an output when the outputs of flip-flops FF1′ and FF2′ are OFF while the output of flip-flop FF4′ is ON. Again, from an examination of waveforms B, C and D it can be seen that this occurs at times $T_2$ and $T_6$. Consequently, and assuming that the output of flip-flop FF2 register 10 is ON, meaning that the digital signal stored in the register includes the bit $2^1$, two pulses will be produced at the output of AND circuit A2 as represented by the waveform H in FIG. 2 for each 16 input pulses from the pulse generator 14.

Finally, AND circuit 20 will apply an output pulse to the AND circuit A1 when the outputs of flip-flops FF1′, FF2′ and FF4′ are OFF while the output of flip-flop FF8′ is ON. Again, from an examination of waveforms B, C, D and E in FIG. 2 it can be seen that this occurs at time $T_4$ only. As a result, and assuming that the count stored in register 10 includes the bit $2^0$, one pulse represented by waveform J will be produced at the output of AND circuit A1 for each 16 input pulses from pulse generator 14.

From a consideration of wave forms F, G, H and J of FIG. 2, it will be appreciated that whenever the digital number stored in register 10 includes the bit $2^3$, eight pulses will be applied to OR circuit 22 when the counter of commutator 12 counts up to its maximum value; when it includes the bit $2^2$, four pulses will be applied to the OR circuit 22; when it includes the bit $2^1$, two pulses will be applied to OR circuit 22; and when it includes the bit $2^0$, one pulse will be applied to OR circuit 22. The pulses applied to the OR circuit 22 from the respective AND circuits A1 through A8, each time the counter of commutator 12 counts up to its maximum count, will be proportional to the bit represented by that AND circuit.

Figure 3:
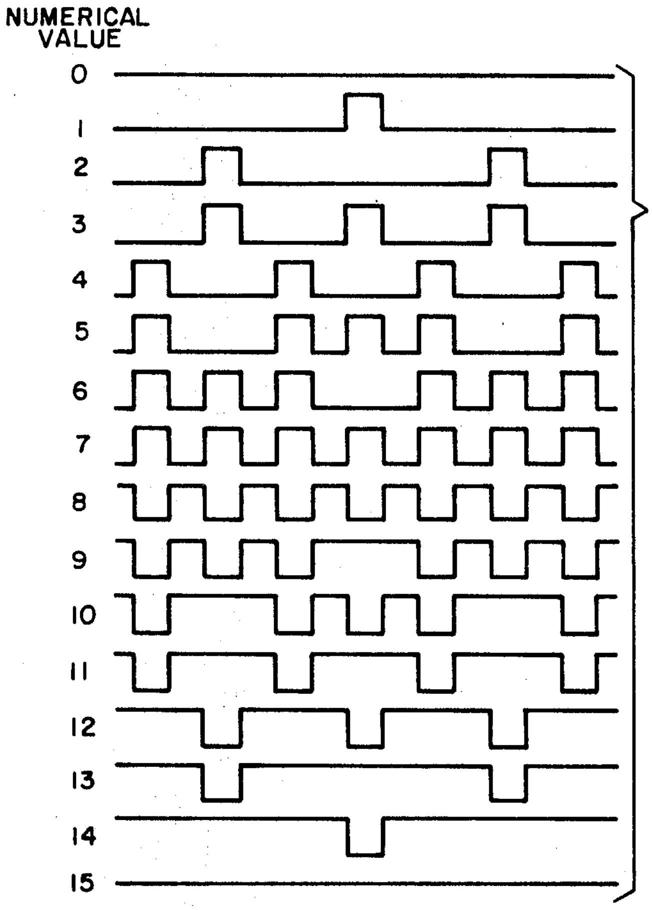
FIG. 3 illustrates the output of the circuit of FIG. 1 for various digital inputs.
Figure 4:
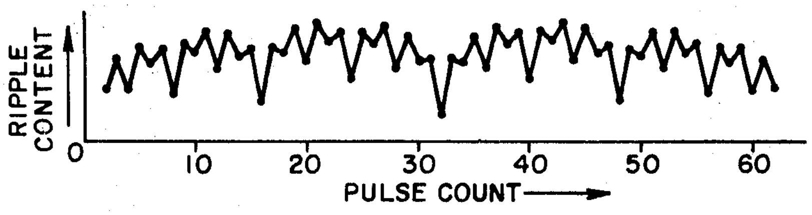
FIG. 4 is a plot of pulse count versus output ripple content for the circuit of FIG. 1.

The output of the OR circuit 22 for various numerical values from 1 through 15 are illustrated by the waveforms of FIG. 3; and it will be noted that all of these waveforms comprise a series of pulses, the greatest number of pulses being for the number 8 which is in the middle of the range. These pulses, when applied to the filter network 24, will produce an output analog signal relatively free from ripple. The ripple content of the output of a single section RC filter for a 6-bit unit is shown in FIG. 4. It will be noted that it is relatively stable over the entire count from zero through 62.

It is a fundamental weakness of prior art pulse duration modulation digital-to-analog converters that they produce the greatest ripple at the middle of the range, where the ripple is K times greater than at $n$=1, where $N$ is the number of bits in the data word and $n$ is the binary number of the register. $K$ is given by:

$$K=2^{(N12)}$$

In other words, for a 4-bit data word, the greatest ripple occurs at a count of eight since, at this time, the leading and trailing edges of the pulse are furtherest separated. The system of the present invention, on the other hand, is not subject to this weakness. For that matter, it produces the lowest ripple at the middle of the range. This can be seen, for example, from a consideration of the ripple content at the output of a 6-bit encoder shown in FIG. 4. The ripple content is lowest at a count of 32, which is the middle of the range. Note also from FIG. 3 that for a 4-bit encoder, for example, the largest number of pulses are produced for a count of eight which again is at the middle of the range and produces the lowest ripple content.

Another advantage of the present invention is its inherently better linearity, which becomes particularly apparent at high clock frequencies. The information of a pulse duration modulation signal is contained in the timing. To retrieve the information, the timing of the leading and trailing edges of the pulse duration modulation pulses must be measured at a given level. Assuming a certain edge distortion of the pulses, the timing error of the basic pulse duration modulation pulses is constant, irrespective of the binary weight of the pulse. Therefore, the percentage error varies with the contents of the register. The timing error of the pulse duration modulation system of the invention does not introduce nonlinearity because the number of pulses containing the time information can be proportional to the contents of the register, if analog summing is used in place of OR circuit 22.

Figure 6:
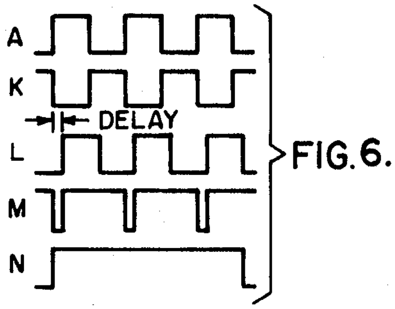
FIG. 6 comprises waveforms illustrating the operation of the circuitry of FIG. 5.
Figure 5:
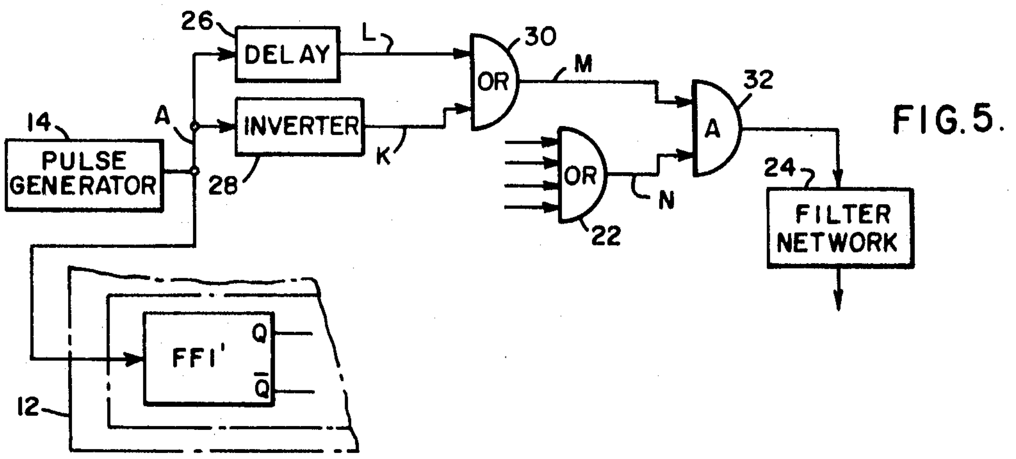
FIG. 5 is a partial schematic circuit diagram showing a modification of the circuit of FIG. 1.

It is, however, possible to achieve better linearity without replacing the OR circuit 22 with analog summing. Such an arrangement is shown in FIG. 5. The output of pulse generator 14, in addition to being applied to the commutator 12, is also applied to a delay line 26 and an inverter 28. The outputs of the delay line 26 and inverter 28 are applied to OR circuit 30 and the output of the OR circuit 30 is combined with the output of OR circuit 22 in AND circuit 32 before being applied to the filter network 24. The effect of the circuit of FIG. 5 is to chop the output of OR circuit 22 into pulses of smaller duration. This can be understood by reference to FIG. 6 where the clock pulses from pulse generator 14 are again represented by waveform A. After inversion, these pulses appear as waveform K; and when they are delayed they appear as waveform L. When waveforms K and L pass through OR circuit 30, waveform M results. The waveform M is now applied to AND circuit 32 with the output of OR circuit 22 which may comprise a relatively long pulse such as that shown by waveform N in FIG. 6. The relatively long pulse of waveform N is chopped into pulses of shorter length which further reduces the occurrence of long pulses interspaced with long spaces.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. In a digital-to-analog converter, the combination of a device having a plurality of output leads with signals thereon representing bits in a binary number, a source of pulses, a binary counter connected to said source of pulses, said binary counter comprising a plurality of bistable units connected in cascade, each bistable unit having a first output terminal connected to the input of the next successive bistable unit in the counter and a second output terminal, the signals appearing on said second terminals being the compliments of those on the first terminals, the number of bistable units in said counter being equal to the number of output leads of said device, first AND logic circuit devices connected to selected ones of the output terminals of said counter bistable units, second AND logic circuit devices connected to said device output leads, said second logic circuit devices also being connected to said first logic circuit devices and at least one of said bistable unit output terminals, and means for filtering the combined outputs of said second logic circuit devices to derive an analog signal.

2. In a digital-to-analog converter, the combination of a device having a plurality of output leads with signals thereon representing bits in a binary number, a source of pulses, a binary counter connected to said source of pulses, said binary counter comprising a plurality of bistable units connected in cascade, each bistable unit having a first output terminal connected to the input of the next successive bistable unit in the counter and a second output terminal, the signals appearing on said second terminals being the compliments of those on the first terminals, the number of bistable units in said counter being equal to the number of output leads of said device, first logic circuit means connected to selected ones of the output terminals of said counter bistable units, second logic circuit means connected to said device output leads, said first logic circuit means comprising a first plurality of logic circuits equal in number to one less than the number of bistable units in said counter and said second logic circuit means comprising a second plurality of logic circuits equal in number to the number of said device output leads, means connecting selected ones of said output terminals of the counter bistable units to the inputs of said first plurality of logic circuits, means connecting one of the output terminals of one of said counter bistable units and one of said device output leads to the inputs of one of said logic circuits in said second plurality of logic circuits, means connecting each of the remaining device output leads to the input of an associated one of the remaining logic circuits in said second plurality of logic circuits along with the output of a selected one of said logic circuits in said first plurality of logic circuits, and a further logic circuit connected to the outputs of all of said logic circuits in said second plurality of logic circuits.

3. The digital-to-analog converter of claim 2 wherein the logic circuits in both said first and second pluralities of logic circuits comprise AND circuits.

4. The digital-to-analog converter of claim 3 wherein the AND logic circuits in said first plurality of logic circuits are connected at their inputs to the second output terminals of all but the last of said bistable units in said binary counter, and are also connected at their inputs to the first output terminals of all but the first of said bistable units in said binary counter.

5. The digital-to-analog converter of claim 4 wherein one of said AND logic circuits in said first plurality of logic circuits is connected to all of said bistable units in said binary counter, and the remaining of said AND logic circuits in said first plurality are successively connected to one less of the bistable units until the last logic circuit in said first plurality is connected to only two of the bistable units in said binary counter.

6. The digital-to-analog converter of claim 5 wherein said one AND logic circuit in said first plurality of logic circuits is connected at its output to the input of the AND circuit in said second plurality of logic circuits to which the output lead of said device is connected representing the least significant bit in said binary number, and said last AND logic circuit in said first plurality of logic circuits is connected through its output lead to the input of the AND circuit in said second plurality of logic circuits to which the output lead of said device is connected representing the next to the most significant bit in said binary number.